United States Patent [19]

Taylor

[11] 4,163,472

[45] Aug. 7, 1979

[54] YOGURT MAKER

[75] Inventor: Frank Taylor, Vaudreuil sur le Lac, Canada

[73] Assignee: Michel Cogger, Montreal, Canada

[21] Appl. No.: 809,065

[22] Filed: Jun. 22, 1977

[51] Int. Cl.² .................. F28D 13/00; A23C 3/02; A23C 9/12
[52] U.S. Cl. .................. 165/104 R; 165/104 S; 99/453; 426/34
[58] Field of Search .................. 165/104 R, 104 S; 126/400; 426/34, 43; 99/453, 455

[56] References Cited

U.S. PATENT DOCUMENTS 3,685,153  8/1972  Borkton .................. 99/455

Primary Examiner—Edgar W. Geoghegan

[57] ABSTRACT

A yogurt maker is formed from an insulated housing incorporating a heat sink and a fermentation compartment. The heat sink is provided by a heated fluid (water) in a container and a thermal barrier partition is provided between the heat sink and the fermentation compartment to control the rate of heat transfer between the heat sink and the fermentation compartment.

8 Claims, 7 Drawing Figures

U.S. Patent  Aug. 7, 1979  4,163,472
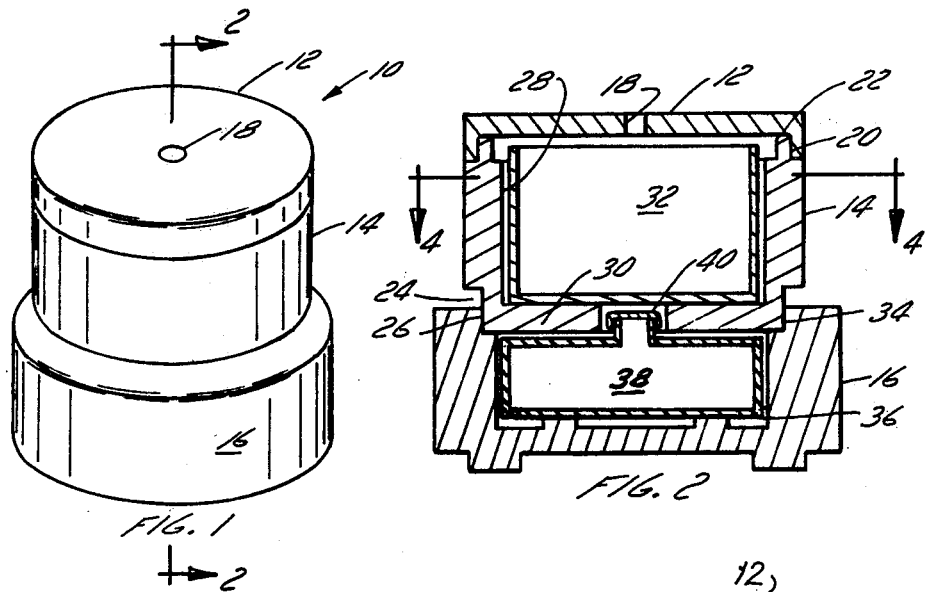
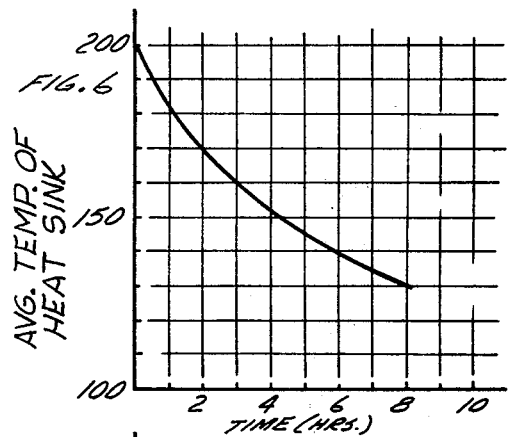
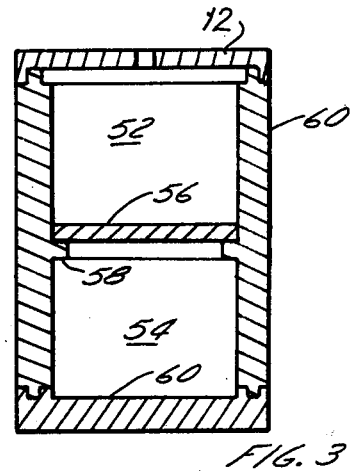
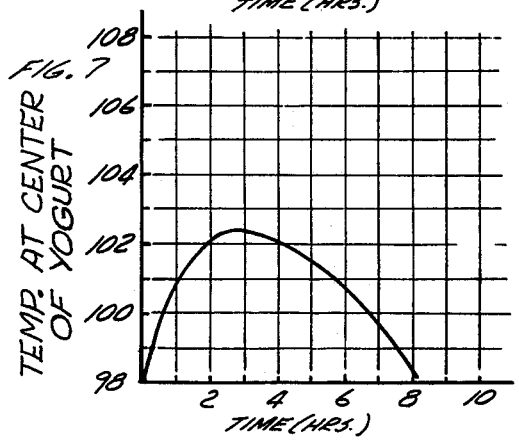
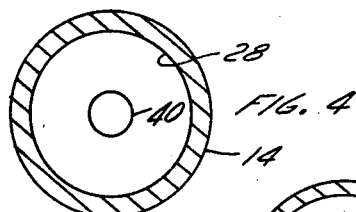
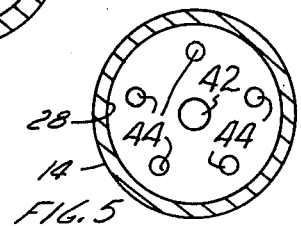

4,163,472

YOGURT MAKER

FIELD OF THE INVENTION

The present invention relates to a yogurt maker. More specifically the present invention relates to an inexpensive domestic yogurt maker utilizing a heat sink to provide the required thermal energy.

PRIOR ART

Yogurt is formed from milk by the fermentation process using the action of two different species of bacteria, namely, streptococcus thermophilus and lactic bacillus. These two bacteria are introduced in equal proportion into sterile milk and held at temperature (generally 100° to 115° F.). The milk lactose is transformed into lactic acid and the milk coagulated to form yogurt. The process generally takes about 8 hours with the time and temperature contributing to the final flavour of the yogurt produced.

As above indicated the temperature during the process must be held within specified limits. If the temperature is too low (below about 100° F.) the fermentation will not continue, and if the temperature is too high (above 115° F.) the bacteria will be destroyed. For this reason conventional domestic yogurt makers are generally electrically powered and themostatically controlled to maintain the yogurt at the required temperature for fermentation. Obviously the price of such devices must reflect the costs of these electrical components and therefore such a unit is moderately costly. Furthermore operation requires the availability of electrical power and therefore it is not suitable for camping or similar applications.

SUMMARY OF THE INVENTION

It is the object of the present invention to provide a simple and economical yogurt maker that does not require electrical power.

Broadly the present invention relates to a yogurt maker comprising an insulating housing; a pair of compartments in said housing, a thermal barrier partition between said compartments to govern the rate of heat transmission between said compartments, means forming a heat sink in one of said compartments, means for thermally sealing said one compartment, a vent into the other of said pair of compartments to provide air for fermentation in said other compartment.

BRIEF DESCRIPTION OF THE DRAWINGS

Further features, objects and advantages will be evident from the following detailed description of preferred embodiments of the present invention taken in conjunction with the accompanying drawings in which:

FIG. 1 is an isometric view of one form of the present invention.

FIG. 2 is a section on the line 2—2 of FIG. 1.

FIG. 3 is a view similar to FIG. 2 but showing a modified form of the present invention with a heat sink and fermentation container omitted.

FIG. 4 is a view along the lines 4—4 shown in FIG. 2 with the fermentation vessel omitted.

FIG. 5 is a view similar to FIG. 4 showing a modification of the thermal partition.

FIG. 6 is a plot of average temperature versus time for the heat sink.

FIG. 7 is a plot of temperature at about the center of the yogurt being produced versus time.

DETAILED DESCRIPTION OF PREFERRED EMBODIMENTS

The yogurt maker 10 of FIGS. 1 and 2 is composed of three parts, a top 12, a fermentation section 14 and a heat sink section 16.

The top 12 has a vent hole 18 positioned at the center thereof and a peripheral flange 20 adapted to frictionally engage with a circumferential projection 22 on the fermentation section 14 to hold the lid or top 12 in position and provide a thermal seal.

The fermentation section 14 as above indicated has a projection 22 stepped in from its outer periphery at the top and is similarly stepped in at the bottom as indicated at 24 to provide a male member 26. A fermentation compartment 28 is formed in the section 14 with the bottom 30 of the compartment 28 providing a thermal barrier to control heat transfer, as will be described hereinbelow. A fermentation container 32 is adapted to be snugly received in the compartment 28 in a manner to inhibit free air convection currents being formed within the compartment 28 and better insure that the heat loss from the yogurt maker 10 is minimal.

The male member 28 on the fermentation section 14 is adapted to be snugly received within the seat 34 formed at the top of the heat sink section 16. The section 16 is provided with a heat sink compartment 36 which is adapted to snugly receive a suitable heat sink 38 which preferably will take the form of a polyethylene bottle filled at the beginning of the process with boiling water as will be explained hereinbelow. Preferably the fit between the heat sink 38 and the compartment 36 will inhibit free convection currents being formed in the same manner as above described with respect to the compartment 28 and container 32.

The thermal barrier 30 at the bottom of compartment 28, in the arrangement illustrated in FIGS. 1, 2 and 4 is provided with a central heat transfer hole 40 which is also adapted to receive the cap of the hot water container forming the heat sink 38. By properly selecting the size of this hole in relation to the size of the yogurt container, the size and initial temperature of the heat sink, the thickness of the barrier 30, and knowing the thermal losses particularly from the fermentation section 14, the proper rate of heat transfer from the heat sink to the fermentation vessel (yogurt container) may be maintained.

In practice it has been found that an arrangement of holes shown in FIG. 5 is preferable, namely an arrangement with a center hole 42 smaller than hole 40 but big enough to receive the cap of the heat sink 38 and with a plurality of further holes 44 (5 shown) arranged symetrically thereabout. The total cross sectional area of all the holes 42 and 44 for a given unit should be about the same as the cross sectional area of the single hole 40 of the FIG. 2 modification to obtain the required heat transfer rate. However, by spreading the holes more uniform heat transfer is obtainable.

As above indicated the yogurt maker 10 is formed of insulating material preferably moulded foam polystryene. With a unit having a fermentation compartment 5¼ inches in diameter and 3¼ inches deep and having a wall thickness of about 1⅜ inches made from 2 lb. foamed polystryene the thermal barrier wall of ¾ inches required a hole of about 2 inches in diameter. This arrangement was operated with a 40 fluid ounce container of water as the heat sink with the container filling the heat sink compartment 2⅝ inches deep and 6⅛ inches in diameter.

The arrangement shown in FIGS. 1 and 2 forms the fermentation chamber and the heat sink chamber as two separate units. They could equally well be made of a single unit 60 as illustrated in FIG. 3. The unit 60 is divided into a fermentation compartment 52 and a heat sink compartment 54 by a thermal barrier partition which may be integral therewith and formed for example in the manner taught hereinabove or alternatively by a separate thermal barrier element 56 supported on a ring 58 and forming the bottom of the fermentation compartment 52.

The compartment 52 is closed by a lid 12 as used in the FIG. 2 embodiment and the compartment 54 is closed by an insulated bottom 60 adapted to cooperate with the walls of the unit 60 and provide a thermal seal.

To operate the unit, for example as shown in FIGS. 1, 2 and 4, milk is first brought to a boil and then allowed to cool to about 100° F., the yogurt culture or its equivalent is added and the mixture placed into the fermentation vessel 32 which in turn is placed into the fermentation compartment 28 of the section 14 and the lid 12 placed in position closing the compartment. Boiling water is poured into the heat sink vessel 38, the vessel closed and then placed into the compartment 36 in the section 16. The section 14 is then placed onto the section 16 to seal the heat sink in position and place the heat sink 38 in communication with the compartment 28 through the thermal barrier 30.

Typical curves of temperature versus time for the heat sink and yogurt are shown in FIGS. 6 and 7 respectively. It will be noted in FIG. 7 that in an 8 hour period the temperature of the yogurt first rises and then falls, but the rise in temperature does not increase the yogurt temperature beyond the safe limit of 115° F. It will be apparent that the temperature variation during the process was less than 5° F. so that the yogurt temperature was easily maintained within acceptable limits. Generally the temperature change at the center of the yogurt should throughout the process not exceed about 10° F. when using the present invention.

Having described the invention modifications will be evident to those skilled in the art without departing from the spirit of the invention as defined in the appended claims.

I claim:

1. A yogurt maker comprising an insulated housing means, a fermentation compartment and a heat sink compartment formed in said housing means, a thermal barrier partition between said fermentation compartment and said heat sink compartment, aperture means in said thermal barrier portion to govern the rate of heat transfer from heat sink compartment to said fermentation compartment, means forming a heat sink in said heat sink compartment, means for thermally sealing said heat sink compartment, vent means for said fermentation compartment to provide the required air for fermentation to make yogurt in said fermentation compartment, said heat sink providing the sole source of thermal energy to maintain said fermentation compartment at fermentation temperature during said fermentation to make yogurt.

2. A yogurt maker as defined in claim 1 wherein said heat sink is formed by a container of hot liquid.

3. A yogurt maker as defined in claim 2 wherein said liquid is water.

4. A yogurt maker as defined in claim 1 wherein said housing means comprises a bottom heat sink section containing said heat sink compartment, a discrete intermediate fermentation section containing said fermentation compartment and a top section.

5. A yogurt maker as defined in claim 1 wherein said thermal barrier partition is integral with said housing means.

6. A yogurt maker as defined in claim 4 wherein said thermal barrier partition is integral with said fermentation section and forms the bottom of said fermentation compartment.

7. A yogurt maker as defined in claim 1 wherein said thermal barrier partition is a discrete element.

8. A yogurt maker as defined in claim 2 wherein said housing means comprises a bottom heat sink section containing said heat sink compartment, a discrete intermediate fermentation section containing said fermentation compartment and a top section.

* * * * *